United States Patent [19]
Shimoyashiki et al.

[11] 3,831,912
[45] Aug. 27, 1974

[54] APPARATUS FOR REFINING SODIUM

[75] Inventors: Shigehiro Shimoyashiki, Hitachi; Kiyoshi Makita, Iwaki; Naoshi Aoki, Hitachi, all of Japan

[73] Assignee: Hitachi Ltd., Tokyo, Japan

[22] Filed: Sept. 27, 1972

[21] Appl. No.: 292,531

[30] Foreign Application Priority Data
Sept. 28, 1971 Japan................................ 46-75677

[52] U.S. Cl..................................... 266/22, 75/66
[51] Int. Cl............................................. C22b 3/02
[58] Field of Search ..................... 75/66; 266/22, 37

[56] References Cited
UNITED STATES PATENTS
2,815,277  12/1957  Bruggeman et al..................... 75/66

*Primary Examiner*—Gerald A. Dost
*Attorney, Agent, or Firm*—Thomas E. Beall, Jr.

[57] ABSTRACT

Refining or the removal of impurities from sodium traveling within a closed circuit for heat exchange of a fast breeder nuclear reactor or the like is obtained by means of a sodium refining chamber as a part of the circuit having therein netlike members disposed against the sodium flow and a heat exchanger for selectively heating and cooling of the sodium as it flows around the netlike members for the precipitation of the impurities during cooling and for the remelting of the impurities during heating. The thus remelted impurities during heating are discharged through a discharge pipe in the lower portions of the sodium flow adjacent the netlike members. The netlike members are constructed of large mesh, knitted wire material having the wire strands constructed of a plurality of fine wires, with the adjacent layers of net having spaces between their faces. The net layers are preferably corrugated, with the direction of corrugation being inclined with respect to the direction of knitting and further being inclined with respect to the corrugations of an adjacent layer. The travel of the sodium through the netlike members is such that it will be in counter flow heat exchange relationship, with the interposition of a heat conductive flow separator, with the flowing liquid sodium that has just passed through the netlike members.

13 Claims, 6 Drawing Figures

PATENTED AUG 27 1974    3,831,912

APPARATUS FOR REFINING SODIUM

BACKGROUND OF THE INVENTION

The present invention relates to apparatus for refining, purifying or generally removing undesirable constituents or impurities from the sodium used as a coolant in a fast breeder nuclear reactor. The apparatus will remove impurities such as sodium oxides and radioactive substances that will form or be present in the sodium during its usage as a heat exchange medium, particularly in a fast breeder reactor.

The presence of oxygen in the sodium will have a great effect upon the cooling potential of the sodium, because the oxygen will form sodium oxide by reaction with the high temperature liquid sodium, which sodium oxide will be liquid at higher temperatures. The sodium oxide presents a greater resistance to circulation than sodium, will precipitate in the low temperature portions of the reactor cooling system, and will tend to stop up small circulation passages. Besides the above-mentioned undesirable characteristics of sodium oxide as they affect the cooling efficiency, an increase in the amount of sodium oxide will undesirably correspondingly increase the corrosion within the cooling system. Therefore, the sodium cooling circulation system is in some areas provided with apparatus for removing the supersaturated impurities, particularly by precipitation through the cooling of the sodium.

Such prior apparatus for removing by precipitation substances from a coolant, for example air, oil or a compound of sodium and potassium (NaK) with low melting point, employ filtration by means of a filter constructed of a wire net made from austenitic stainless steel or by filter made of a plurality of tips. In filtration using the wire net, some meshes of the wire net have been stopped up by the impurities; if the mesh of the net were made larger to prevent the stopping up, the filtration would not be satisfactory. In filtration with a plurality of austenitic stainless steel tips, a satisfactory effect has not been obtained because of partial stopping up.

SUMMARY OF THE DISCLOSURE

It is an object of the present invention to filter liquid material such as sodium by apparatus having a high efficiency of filtration without an extreme increase in the resistance to the flow of the liquid sodium. It is further desirable to employ a simple construction for the filter. Also in filtering the sodium with cooling, it is an object to recover the heat removed from the sodium by a heat exchanger for return to the filtered sodium.

According to the present invention, there is provided an apparatus for filtering liquid sodium, which comprises a passage for circulating liquid sodium, at least a netlike member disposed in the full flow of the sodium in the passage, a heat exchanger for selectively heating or cooling the sodium as it flows through and around the netlike member, and means below the sodium flow with respect to the netlike member for discharging impurities that have been precipitated from the sodium due to the effect of the cooling and netlike member. The netlike member is preferably constructed of a net with large meshes, which net is knitted with strands comprising a plurality of fine wires, with a plurality of piled or stacked spaces between one net face and another net face opposing the first net face.

BRIEF DESCRIPTION OF THE DRAWING

Further objects, features and advantages of the present invention will become more clear from the following detailed description of the drawing, wherein.

DETAILED DESCRIPTION OF THE INVENTION

Figure 1:
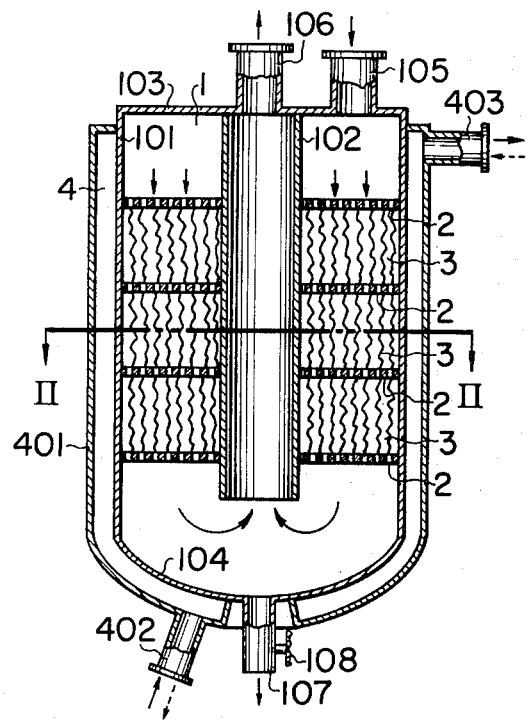
FIG. 1 shows a preferred embodiment of the present invention for refining sodium, with the view being in axial cross section.
Figure 2:
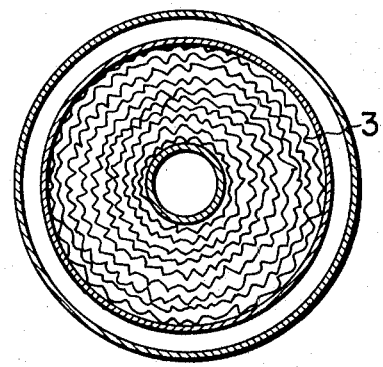
FIG. 2 is a cross sectional view taken along line II—II of FIG. 1.

Referring to FIG. 1 and FIG. 2 showing a cold trap type apparatus for refining or filtering a fluid, particularly liquid sodium as a heat exchange fluid in a fast breeder nuclear reactor, there is shown a sodium refining chamber 1 enclosed except for inlets and outlets, which is a part of a closed circulation system for melted or liquid sodium. The chamber 1 is constructed of a cylindrical plate 101 having its upper end sealingly attached around its periphery to an upper plate 103, an inlet conduit or coupling 105 secured to and opening through the upper plate 103, an outlet coupling or conduit 106 secured to and opening through the upper plate 103, a partially spherical lower plate 104 sealingly secured around its periphery to the lower terminal end of the cylindrical plate 101, and an impurity discharge pipe 107 attached to and opening through the lower plate 104. A central tube or conduit 102 depends from and is sealingly secured to the inner surface of the upper plate 103 to be in communication with the outlet conduit 106. The depending impurity discharge pipe 107 is provided with a control valve 108.

Within the interior of the sodium refining chamber 1, there are provided a plurality of annular plates 2 sealingly and completely extending between the outer surface of the conduit 102 and the inner surface of the cylindrical plate 101, with the exception of a plurailty of axial holes extending through the plates 2, which axis refers to the vertical axis of symmetry for the cylindrical plate 101 and conduit 102, as shown in FIG. 1. The plates 2, four being shown, are vertically stacked at regular intervals or spacings. Axially between adjacent plates 2, there are provided netlike members 3.

Around the sodium refining chamber 1, there is provided a heat exchange chamber 4, which is not in fluid communication with the interior of the chamber 1, and is defined by the cylindrical plate 101, the lower plate 104, an outer cylindrical plate 401, a lower partially spherical closure plate below plate 104, and various closure members. A suitable heat exchange fluid may circulate through the heat exchange chamber 4 by means of inlet or outlet conduit 402 and outlet or inlet conduit 403.

The liquid sodium from the closed heat exchange circulation system of a fast breeder nuclear reactor or the like enters the sodium refining chamber 1 through the inlet 105, passes downwardly through the axially extending holes of the plates 2 and through or along the netlike members 2, in order, reverses direction and travels upwardly through the conduit 102, and is returned to the cooling system through the outlet conduit 106. In passage through the apparatus of FIG. 1, the liquid or melted sodium is cooled by the heat exchange with the heat exchange chamber 4 having circulated cooling medium therein which enters the heat exchange chamber 4 through its inlet 402 and departs from its outlet 403, which heat exchange will cool the sodium oxides or radioactive substances to their state of supersaturation. When the liquid sodium passes through or along the netlike members 3, the impurities such as sodium oxides and the radioactive substances will be precipitated by the netlike members 3 and the cooling of the sodium. Contact of the sodium, particularly in its supersaturation state, with the netlike members 3 will promote or initiate the precipitation of the above-mentioned impurities. Therefore, it is desirable to make the surface of the netlike members 3 as large as possible relative to the flow of sodium without adversely increasing the resistance to the passage of the liquid sodium. The sodium as refined or filtered by the netlike members 3 will pass upwardly through the central conduit 102 in a direction opposite to its axial inlet direction, so that the conduit 102 acts as a counter flow heat exchanger between the outgoing sodium and the incoming sodium, with the result that the temperature of the sodium will increase from the lower portion to the upper portion of the conduit 102 due to the recovery of heat.

Periodically it is desirable to remove the thus precipitated impurities from the sodium refining chamber 1. Accordingly, the impurities precipitated by and on the netlike members 3 will be melted again by heating through the action of heat exchange chamber 4 taking in a heated fluid or medium through the conduit 403 and discharging it through the conduit 402, which will raise the temperature of the entire chamber 1 to heat and melt the precipitated impurities so that they will travel downwardly where they may be discharged downwardly through the impurity discharge pipe 107 by opening the valve 108. Thus, it is seen that the heat exchange chamber 4 is used for cooling purposes during the filtering cycle and is used for heating purposes during the precipitated impurities removal cycle.

Figure 3:
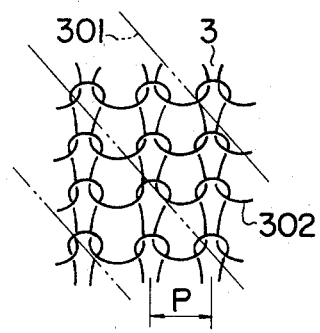
FIG. 3 shows, in elevation, one thickness of the net material used in constructing the apparatus for refining sodium as shown in FIG. 1.
Figure 4:
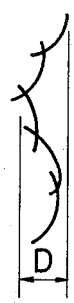
FIG. 4 is a side view of the net as shown in FIG. 3.
Figure 5:
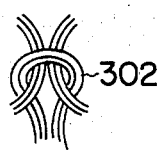
FIG. 5 is an enlarged view of a portion of the net shown in FIG. 3.
Figure 6:
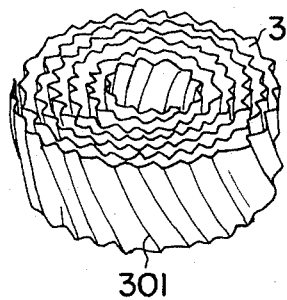
FIG. 6 is a perspective view of the netlike material as used in the apparatus shown in FIG. 1.

The netlike members 3 are constructed of a net material as shown in FIG. 3 through FIG. 5, which in these figures is shown of only a single thickness. The net material is knitted with the strands 302 to have relatively large meshes (with a pitch P of about 7 to 8 millimeters), as shown in FIG. 3 and the enlarged portion in FIG. 5. Each strand 302 is preferably a plurality of (10–20) austenitic stainless steel wires laid in parallel or slightly twisted. The diameter of each of these wires is preferably within the range of 0.1 to 0.2 millimeters. The net material as shown in FIG. 3 is permanently deformed or corr gated to provide a wave or sawtooth shape, and further folded into a double thickness. The corrugations that form the sawtooth or wave configuration particularly as shown in FIG. 4 have a corrugation depth D, and a configuration such that each corrugation may be represented by a line 301 in FIG. 3, with the direction of such corrugations forming an acute angle with respect to the direction of weaving, as shown. Each of the netlike members 3 (3 being shown in FIG. 1) is formed from the sawtoothed or waved and folded net material by winding or coiling this net material into the spiral form as shown in FIG. 6. Due to the plurality of the wave or corrugation lines 301 that are inclined with respect to both the direction of weaving and the axial direction of the apparatus, there will be provided a plurality of spaces between a net face and another net face disposed in opposition to the first net face, for adjacent coils. These spaces will avoid an extreme increase in the circulation resistance of the sodium. The netlike member 3 is so contained within the sodium refining chamber 1 that an annular face is directed to the sodium flow within the chamber 1.

With the folding of the netlike material, each coil of the spiral shown in FIG. 6 will be of a double thickness of net. With corrugation of the net material being before the net material is folded, each coil will have inner and outer faces with corrugations extending in opposite directions, so that adjacent coils will have contacting faces wherein the corrugations cross each other to maintain a uniform spacing between coils substantially greater than would be obtained without corrugation, and to provide a plurality of spaces stacked in the axial direction.

In the preferred embodiment of the present invention, the fine wires are made from austenitic stainless steel, which is known as SUS27 according to the Japanese Industrial Standard as applied to the netlike member. The diameter of the wire must be less than one millimeter, because the larger the diameter of the wire is, the less will be the effect on the precipitating of the impurities from the sodium in addition to difficulties in handling.

Since the netlike member knitted with the fine wires has a three dimensional construction, the netlike member will have many chances to contact the sodium with the fine wires so that precipitation of the impurities will be promoted by the three dimensional construction, and further the netlike member is so porous due to this three dimensional construction that the impurities will not stop up or clog the meshes of the netlike member.

While a preferred embodiment of the present invention has been illustrated and described, further embodiments, variations and modifications are contemplated within the spirit and scope of the present invention as defined by the following claims.

What is claimed is:

1. Apparatus for refining liquid sodium by cooling the impurities to a supersaturation state and precipitating them, comprising: passage means for conducting liquid sodium; at least one netlike member disposed within said passage against the flow of sodium through said passage means for precipitating the impurities; heat exchange means adjacent said netlike member for cooling the sodium, to provide the impurities in a supersaturation state, as it flows through said passage means and netlike member; said netlike member being constructed of a plurality of adjacent layers of large mesh net material with means providing spaces between adjacent layers; said heat exchange means further selectively heating the sodium as it passes through said netlike member to remelt previously precipitated impurities; and further including means for selectively discharging the remelted impurities from said passage means.

2. The apparatus of claim 1, wherein said net material is knitted from strands each comprising a plurality of fine wires.

3. The apparatus of claim 2, wherein said strands have a diameter less than one millimeter.

4. Apparatus for refining liquid sodium by cooling the impurities to a supersaturation state and precipitating them, comprising: passage means for conducting liquid sodium; at least one netlike member disposed within said passage against the flow of sodium through said passage means for precipitating the impurities; heat exchange means adjacent said netlike member for cooling the sodium, to provide the impurities in a supersaturation state, as it flows through said passage means and netlike member; said netlike member being constructed of a plurality of adjacent layers of large mesh net material with means providing spaces between adjacent layers; said means providing spaces including layers being corrugated so that the corrugations of one net layer face meet the corrugations of the adjacent net layer face to form the spaces between layers.

5. The apparatus of claim 4, wherein said layers are formed in pairs, each formed of knitted sheet material corrugated and folded upon itself to form a double thickness of corrugated knitted material.

6. The apparatus of claim 5, wherein said netlike member is constructed of said corrugated and folded knitted material coiled in a spiral form to form said adjacent layers.

7. The apparatus of claim 4, wherein said netlike member is constructed of said corrugated material coiled in a spiral form to form said adjacent layers.

8. Apparatus for refining liquid sodium by cooling the impurities to a supersaturation state and precipitating them, comprising: passage means for conducting liquid sodium; at least one netlike member disposed within said passage against the flow of sodium through said passage means for precipitating the impurities; heat exchange means adjacent said netlike member for cooling the sodium, to provide the impurities in a supersaturation state, as it flows through said passage means and netlike member; said netlike member being constructed of a plurality of adjacent layers of large mesh net material with means providing spaces between adjacent layers; a plurality of parallel and axially spaced annular plates, each having a plurality of axial passages therethrough for the passage of liquid sodium; concentric inner and outer tubular walls forming with said annular plates a plurality of axially spaced annular chambers; and a separate netlike member substantially completely filling each of said annular chambers.

9. The apparatus of claim 8, wherein said netlike members are constructed of coiled sheets of corrugated net material, with the corrugations of adjacent contacting coils forming acute angles therebetween.

10. The apparatus of claim 9, wherein said heat exchanger means extends concentrically around said outer tubular wall; and said passage means provides a first flow of sodium in one axial direction through the alternate annular plates and netlike members, and thereafter in the opposite axial direction through the interior of said inner tubular wall to be in counter-heat exchange relationship with the first flow of sodium to be reheated thereby.

11. The apparatus of claim 8, wherein said heat exchanger means extends concentrically around said outer tubular wall; and said passage means provides a first flow of sodium in one axial direction through the alternate annular plates and netlike members, and thereafter in the opposite axial direction through the interior of said inner tubular wall to be in counter-heat exchange relationship with the first flow of sodium to be reheated thereby.

12. The apparatus of claim 8, wherein said netlike material is constructed of woven wires having a diameter less than one millimeter.

13. Apparatus for refining liquid sodium by cooling the impurities to a supersaturation state and precipitating them, comprising: passage means for conducting liquid sodium; at least one netlike member disposed within said passage against the flow of sodium through said passage means for precipitating the impurities; heat exchange means adjacent said netlike member for cooling the sodium, to provide the impurities in a supersaturation state, as it flows through said passage means and netlike member; said netlike member being constructed of a plurality of adjacent layers of large mesh net material with means providing spaces between adjacent layers; said netlike material being constructed of woven wires having a diameter less than one millimeter.

* * * * *